Dec. 5, 1950 J. E. CORBIN ET AL 2,532,697

VOLTAGE SUPPLY APPARATUS

Filed Sept. 11, 1948

INVENTORS J. E. CORBIN
R. C. NEWHOUSE
BY H. A. Burgess
ATTORNEY

Patented Dec. 5, 1950 2,532,697

UNITED STATES PATENT OFFICE 2,532,697

VOLTAGE SUPPLY APPARATUS

Joseph E. Corbin, West Orange, and Russell C. Newhouse, Millburn, N. J., assignors to Bell Telephone Laboratories, Incorporated, New York, N. Y., a corporation of New York Application September 11, 1948, Serial No. 48,896

7 Claims. (Cl. 171—97)

This invention relates to power supply systems and more particularly to systems for deriving high voltage unidirectional currents.

Cathode ray tubes associated with radar systems often require direct current anode potentials on the order of 10,000 volts. The conventional half-wave rectifier type supplies operating from the main power frequency require a cumbersome and heavy transformer and a large filter capacitor in order to obtain a cathode ray anode supply with ripple within the required limits. It is well known that the value of the filter capacitor required to obtain direct current output with a superimposed ripple of a given amplitude is inversely proportional to the frequency. Thus the filter capacitor for a rectifier operating from a 1,000 cycles per second input would be $^{60}/_{1000}$ as large as one operating from a 60 cycles per second power line.

Systems have been devised and are in common use in radar and television equipment utilizing vacuum tube oscillators as sources of audio or radio frequency power in order to take advantage of this filter principle. The advantage of the small filter is largely offset by the size of the oscillator and the reliability is decreased because of the additional oscillator vacuum tube and associated circuit elements.

Other systems have been devised to derive the requisite high voltage from the scanning circuits by utilizing the sweep flyback, thus gaining the filter advantages of a high frequency power supply. But in radar systems using variable duration sweeps, the adjustments which must be made automatically when switching range scales in order to maintain the cathode ray anode at a suitable potential have been such as to offset any filter economy.

It is an object of this invention to derive a direct current high voltage with an economy of filtering and additional parts and with an enhanced reliability.

In accordance with the invention, such a voltage supply is derived from a line type modulator of the type disclosed in United States Patent 2,411,898 to J. C. Schelleng, December 3, 1946. A portion of the energy used to charge the pulse forming network of such a modulator is transformed to a higher potential, rectified and filtered to provide a direct current voltage suitable for the anode potential or for other applications.

Since line type modulators charge the pulse network through an inductance, the maximum voltage reached by the pulse forming network during the charging interval is approximately twice the voltage of the direct current supply. Thus the circuit acts as a voltage doubler, which, along with the additional step-up obtained by making the charging choke an auto-transformer permits voltages appreciably greater than the supply voltage to be obtained.

As will be apparent in the following detailed description of a preferred embodiment, a simple modification of a conventional line type of radar modulator permits it to supply the required high voltage power without interfering with its normal function. Thus a direct current supply for cathode ray tube use is obtained with the reliability and stability of the radar modulator and transmitter itself and with a minimum of additional parts.

These and other objects, features and aspects of this invention may be better understood by reference to the following detailed description in connection with the drawing in which.

Figure 1:
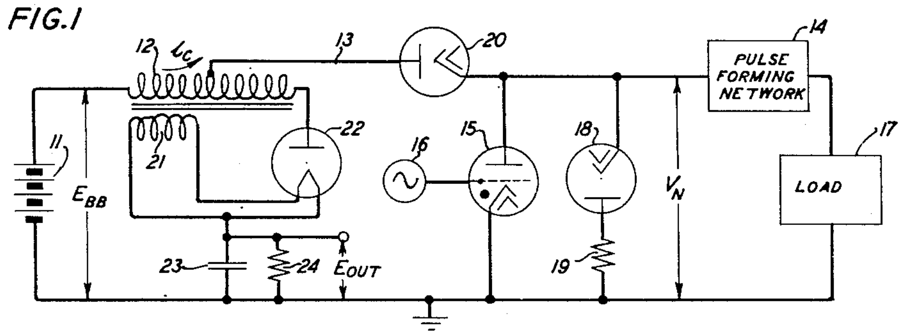
Fig. 1 is a schematic diagram of an embodiment of the invention.

Referring now to Fig. 1, a source of direct current 11 supplies current through a charging choke 12 via conductor 13 and diode 20 to a pulse forming network 14 when the switch 15 is non-conducting. As shown in the figure, switch 15 comprises a grid controlled gas tube, preferably a hydrogen-filled thyratron, triggered by an oscillator 16. When the switch 15 is ionized by having its grid driven sufficiently positive by the oscillator 16, it becomes a very low impedance and causes the pulse forming network 14 to discharge through the thyratron to the load 17. The load 17 in many radar circuits comprises a transformer and a centimeter wave oscillator such as a magnetron. However, there is no restriction on the type of load for the proper function of the modulator as long as it presents a good impedance match. The diode 18 and resistance 19 are used to prevent the network 14 from charging negatively in case of a breakdown in load 17 and thus cause excessive voltage to be built up across the pulse network 14. When the network 14 has completely discharged, the thyratron 15 deionizes and the circuit is ready to recharge the network 14.

A more detailed analysis of line type modulators may be found in the book entitled "Pulse Generators," published by the McGraw-Hill Book Company, Inc., New York, 1948. As therein disclosed, particularly in sections 8 and 9, the voltage at the network 14, $V_N$, rises to a value equal to approximately twice the voltage of the source 11 $E_{BB}$ due to the charging inductance 12, and in a period of time depending on the time constant of the LC circuit comprising the inductance 12 and the predominantly capacitive (at least at the charging frequency) network 14.

Figure 2A:
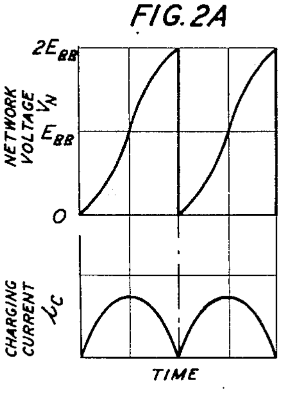
Figs. 2A, 2B and 2C are explanatory diagrams.

The diagrams of Fig. 2 illustrate three conditions of operation for the circuit of Fig. 1. Fig. 2A illustrates the variation with time of the voltage $V_N$ on the network 14 and the charging current $i_c$ flowing through the choke 12 when the pulse repetition frequency is one-half the resonant frequency of the choke 12-network 14 circuit. It will be seen that the thyratron fires and discharges the network 16 at the moment of maximum charge voltage; this is known as resonant charging. In such a case the charging diode 20 is unnecessary.

Figure 2B:
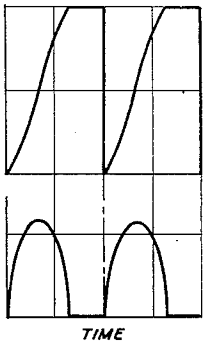

Fig. 2B illustrates a condition when the resonant frequency of the LC circuit 12—14 is greater than one-half the pulse repetition frequency. In this case the inductance of the charging choke 12 is less than that required for resonant charging. The voltage of the network 14 is held at the maximum value reached during the charging cycle by the diode 20 until the next discharge through the switch 15 occurs. The diode 20 prevents reversal of the current in the choke and thus avoids the damped oscillation which would otherwise occur.

Figure 2C:
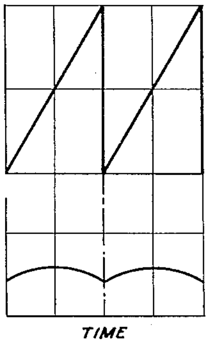

When the inductance of the charging choke 12 is greater than that required for resonant charging, "linear charging" results as illustrated in Fig. 2C. In this case the voltage on the network 14 is still rising at the time the switch 15 is fired. However, since the current in choke 12 never reaches zero, the voltage across the pulse network 14 builds up to the same value as in the first two cases illustrated by Fig. 2A and Fig. 2B.

In carrying out the invention, charging choke 12 has been made the primary winding of an auto-transformer that steps up the voltage across the entire winding above the voltage appearing across the tap by a ratio proportional to the turns ratio on the two sections of the tapped winding. A separate winding 21 is also provided on the charging choke 12 core to heat the filament of the rectifier diode 22. The filament current of the diode 22 is of approximately the same wave shape as the currents plotted in Fig. 2 except for the elimination of the superimposed direct current component shown in the figure. The vacuum diode 22 rectifies the stepped-up charging wave which is filtered by the condenser-resistor combination 23—24. The desired high unidirectional voltage $E_{out}$ is obtained across the resistor 24.

Figure 3:
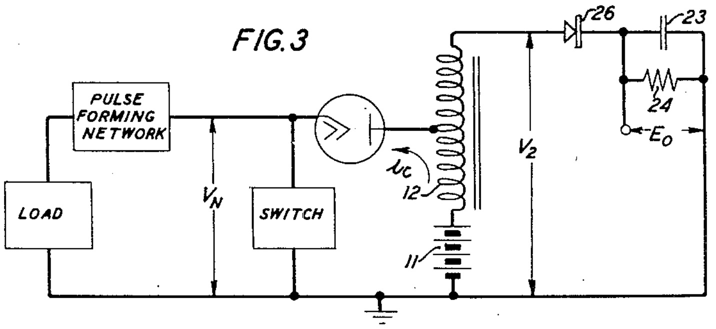
Figs. 3 and 4 are modifications of the circuit of Fig. 1.

The modification illustrated in Fig. 3 emphasizes the charging inductance 12 as the primary winding of an auto-transformer. A dry contact rectifier 26 has been substituted for the vacuum diode 22 of Fig. 1, thus eliminating the need for the filament winding 21 on the choke 12.

Figure 4:
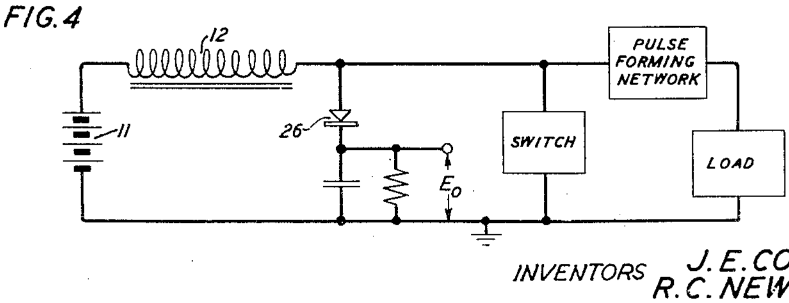

The modification in Fig. 4 omits the auto-transformer, using only the conventional charging choke 12. In this case a direct current voltage $E_0$ equal to approximately twice the source 11 voltage $E_{BB}$ is obtained with the addition of only a suitable rectifier 26, a filter condenser 23 and a resistor 24.

The invention has been described as relating to a line type modulator using a hydrogen thyratron switching tube. The invention is not, however, limited to this type of switch and can be used equally well with line type modulators using rotary or fixed spark gaps such as are described in the Bell System Technical Journal, volume XXV, Nov. 4, 1946, or with other types of switches well-known in the art. Nor is the invention limited by the methods of charging as illustrated in Figs. 2A, 2B and 2C.

By properly selecting the circuit constants, it is possible to eliminate the charging diode 20 and with a well matched stable load 17 it is possible to operate without the shunt diode 18. Other modifications within the scope of the invention will become apparent to one skilled in the art.

What is claimed is:

1. The combination of a pulse generating system comprising a pulse forming network charged by a source of unidirectional current in series with a charging inductance, a load circuit, and means to periodically complete a circuit from said pulse network to said load, with means energized by the charging voltage of said pulse forming network for deriving a substantially constant direct voltage of large magnitude relative to the voltage of said source.

2. The combination of a pulse generating system comprising a pulse forming network which is charged electrically by a source of unidirectional current in series with a charging inductance, said inductance comprising the low voltage winding of an auto-transformer, a load circuit, and switching means for periodically discharging said pulse forming network through said switching means to said load, of rectifying means connected across the high voltage winding of said auto-transformer and said source in series, and filtering means in the output circuit of said rectifying means to render the direct current output thereof substantially constant.

3. A combination in accordance with claim 2 in which said filtering means comprises resistance and capacitance in parallel, the product of said resistance in ohms and said capacitance in farads being large compared to the number of seconds between successive discharges of said pulse forming network.

4. In combination, a line type pulser comprising a pulse forming network, means comprising a source of unidirectional current in series with a charging inductance to charge said pulse forming network to approximately twice the voltage of said source, a load circuit, switching means to periodically and at predetermined intervals complete a circuit from said network to said load, unidirectional conducting means to substantially prevent the flow of current from said network to said inductance, means in parallel with said first-named means and inductively coupled to said inductance to derive a substantially constant direct voltage of large magnitude relative to the peak voltage to which said network is charged.

5. In combination, a pulse forming network predominantly capacitive at the charging frequency, unidirectional current means in series with a charging inductance to charge said network electrically, said inductance comprising the low voltage winding of an auto-transformer, unidirectional conducting means interposed between said inductance and said network to readily pass charging current from said inductance to said network but substantially preventing the flow of current from said network to said inductance, a load circuit, unidirectional conducting switching means to periodically and at predetermined intervals discharge said network through said switching means to said load, unidirectional conducting means connected in parallel to said last-named means to provide a conducting path in the direction opposite to that provided by said switching means, rectifying means connected to the high voltage side of said auto-transformer and said source in series, means to derive from said rectifying means a substantially constant direct voltage of large magnitude relative to said source.

6. In combination, a pulse generating system comprising a pulse forming network, a source of unidirectional current in series with a charging inductance to charge said network, a load circuit, and switching means to periodically complete a circuit from said network through said switching means to said load, and rectifying means responsive to the charging voltage of said network, said rectifying means comprising a space discharge device comprising a plate, a cathode and a space current path and thermionic means energized by means inductively coupled to said charging inductance to heat said cathode.

7. A circuit comprising a line-type modulator having a pulse forming network, a source of direct current, an inductance, means to charge said pulse forming network from said source through said inductance, a load, means to recurrently discharge said network to said load, an auto-transformer having said inductance as the low voltage winding thereof, and rectifying means connected across the high voltage winding of said auto-transformer and said source in series.

JOSEPH E. CORBIN.
RUSSELL C. NEWHOUSE.

REFERENCES CITED

The following references are of record in the file of this patent:

UNITED STATES PATENTS

| Number | Name | Date |
|---|---|---|
| 2,411,898 | Schelleng | Dec. 3, 1946 |